US009928271B2

(12) United States Patent
Agarwal et al.

(10) Patent No.: US 9,928,271 B2
(45) Date of Patent: *Mar. 27, 2018

(54) AGGREGATING AND SUMMARIZING SEQUENCES OF HIERARCHICAL RECORDS

(71) Applicant: International Business Machines Corporation, Armonk, NY (US)

(72) Inventors: Manoj K. Agarwal, Noida (IN); Amitava Kundu, Bangalore (IN); Rajesh Sambandhan, Bangalore (IN); Mangesh V. Shanbhag, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,818

(22) Filed: Jun. 28, 2016

(65) Prior Publication Data

US 2016/0378798 A1  Dec. 29, 2016

Related U.S. Application Data

(63) Continuation of application No. 14/750,301, filed on Jun. 25, 2015.

(51) Int. Cl.
*G06F 7/00* (2006.01)
*G06F 17/30* (2006.01)
*G06F 11/34* (2006.01)

(52) U.S. Cl.
CPC .... *G06F 17/30377* (2013.01); *G06F 11/3409* (2013.01); *G06F 17/30477* (2013.01);
(Continued)

(58) Field of Classification Search
CPC .......... G06F 17/30477; G06F 11/3409; G06F 2201/87
See application file for complete search history.

(56) References Cited

U.S. PATENT DOCUMENTS 7,117,172 B1   10/2006  Black
7,389,301 B1*   6/2008  Mazzagatti ....... G06F 17/30489
(Continued)

OTHER PUBLICATIONS

Agrawal et al., "Mining Sequential Patterns", IBM Almaden Research Center, 650 Harry Road, San Jose, CA 95120, pp. 1-12, ICDE '95 Proceedings of the Eleventh International Conference on Data Engineering, IEEE Computer Society Washington, DC, USA © 1995.
(Continued)

*Primary Examiner* — Charles E Lu
(74) *Attorney, Agent, or Firm* — Bryan D. Wells

(57) ABSTRACT

Sequences of hierarchical records are aggregated and summarized. A capture log that includes a plurality of operations of a workload is received. A first data structure that models transaction types as sequences of nodes is created. The nodes identify operations in the workload. A present operation and a transaction identifier are read from the capture log. The transaction identifier is dissociated from a first node that identifies a prior operation. The transaction identifier is associated with a second node that identifies the present operation. In a second data structure that associates nodes with transaction identifiers, the first node is dissociated from the transaction identifier and the second node is associated with the transaction identifier. A summary of the workload is generated based, at least in part, on the first and second data structures. The summary includes signatures of transaction types and counts of instances of the transaction types.

7 Claims, 12 Drawing Sheets

(52) U.S. Cl.
CPC .. *G06F 17/30489* (2013.01); *G06F 17/30876* (2013.01); *G06F 17/30949* (2013.01); *G06F 17/30961* (2013.01)

(56) References Cited

U.S. PATENT DOCUMENTS

| | | | |
|---|---|---|---|
| 7,499,908 B2 | 3/2009 | Elnaffar et al. | |
| 7,814,080 B1* | 10/2010 | Luo | G06F 17/30463 707/687 |
| 8,122,035 B2* | 2/2012 | Childress | G06F 17/30448 705/39 |
| 8,347,292 B2* | 1/2013 | Beckerle | G06F 9/466 707/693 |
| 8,732,302 B2* | 5/2014 | Jorgenson | H04L 41/12 709/224 |
| 8,788,471 B2 | 7/2014 | Agarwal et al. | |
| 8,977,587 B2 | 3/2015 | Agarwal et al. | |
| 9,063,944 B2 | 6/2015 | Agarwal et al. | |
| 9,639,874 B2* | 5/2017 | Psota | G06Q 30/0609 |
| 2006/0206894 A1 | 9/2006 | Jung et al. | |
| 2007/0233644 A1* | 10/2007 | Bakalash | G06F 17/30457 |
| 2009/0144070 A1* | 6/2009 | Psota | G06Q 10/083 705/330 |
| 2012/0125751 A1* | 5/2012 | Nakase | H03K 17/975 200/345 |
| 2012/0215751 A1 | 8/2012 | Broll et al. | |
| 2012/0284188 A1* | 11/2012 | Vasquez | G06Q 30/0601 705/44 |
| 2014/0337283 A1 | 11/2014 | Agarwal et al. | |

OTHER PUBLICATIONS

Park et al., "Efficient Searches for Similar Subsequences of Different Lengths in Sequence Databases" This work is supported in part by grants from the NSF (IRI-9619345) and the NIH (CA5 1198-07), DOI: 10.1109/ICDE.2000.839384, 16th International Conference on Data Engineering, 2000, pp. 1-10.

"IBM InfoSphere Workload Replay, Version 2.1.x releases: new features and enhancements", IBM, Version V2.1.0.3, Modified date: Apr. 24, 2015, pp. 1-5, <www-01.ibm.com/support/docview.wss?uid=swg27038167>, Grace Period Disclosure.

"Improving the Quality of Data Server Performance and Stress Testing", IBM, Grace Period Disclosure, © 2015 IBM Corporation, pp. 1-26, created Apr. 24, 2015, <https://www.ibm.com/developerworks/community/groups/service/html/communityview?communityUuid=ca60e912-0fc7-42e4-9ea8-c081712d0e90#fullpageWidgetId=Wb72bc52063ac_4409_8ae3_6c5c78c08c4d&file=c5a13e4f-9dc7-469e-9edb-dad7cca6d725>.

Agarwal et al., "Aggregating and Summarizing Sequences of Hierarchical Records", U.S. Appl. No. 14/750,301, 44 pages, filed Jun. 25, 2015.

Appendix P, List of IBM Patents or Patent Applications Treated as Related, 2 pages, dated Jul. 20, 2016.

* cited by examiner

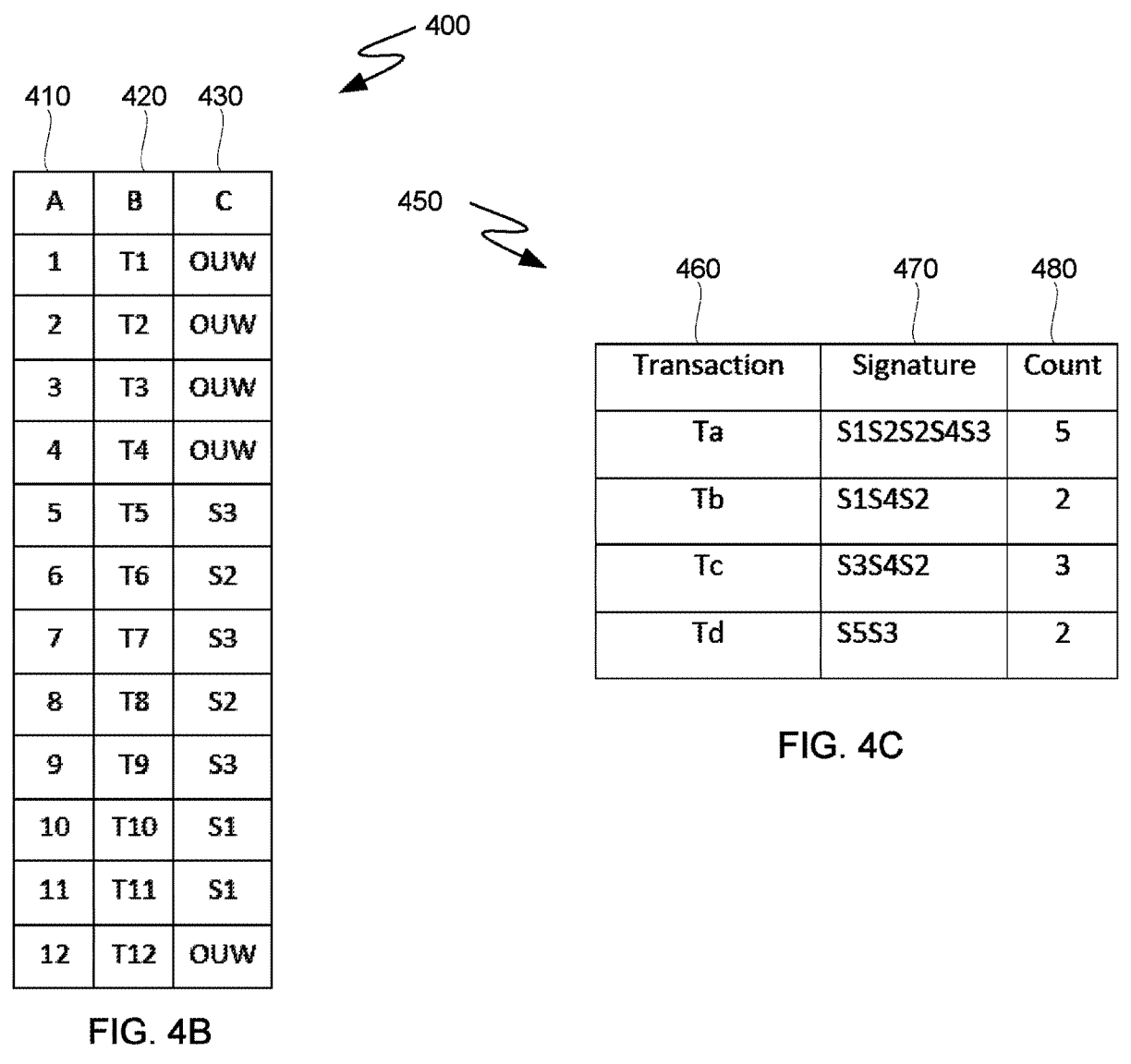

| Transaction | Signature | Count |
|---|---|---|
| Ta | S1S2S2S4S3 | 5 |
| Tb | S1S4S2 | 2 |
| Tc | S3S4S2 | 3 |
| Td | S5S3 | 2 |

FIG. 4C

| A | B | C |
|---|---|---|
| 1 | T1 | OUW |
| 2 | T2 | OUW |
| 3 | T3 | OUW |
| 4 | T4 | OUW |
| 5 | T5 | S3 |
| 6 | T6 | S2 |
| 7 | T7 | S3 |
| 8 | T8 | S2 |
| 9 | T9 | S3 |
| 10 | T10 | S1 |
| 11 | T11 | S1 |
| 12 | T12 | OUW |

FIG. 4B

AGGREGATING AND SUMMARIZING SEQUENCES OF HIERARCHICAL RECORDS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) "IBM InfoSphere Workload Replay, Version 2.1.x releases: new features and enhancements," IBM Product Documentation, published on Apr. 24, 2015, See Version V2.1.0.3 (product released on Apr. 23, 2015), <http://www-01.ibm.com/support/docview.wss?uid=swg27038167>;

(ii) "Improving the Quality of Data Server Performance and Stress Testing," slides 19, 20, and 25, describing features of IBM InfoSphere Workload Replay Version V2.1.0.3, IBM developerWorks community for InfoSphere Workload Replay, published on Apr. 24, 2015, <https://www.ibm.com/developerworks/community/groups/service/html/communityview?communityUuid=ca60e912-0fc7-42e4-9ea8-c081712d0e90#fullpageWidgetId=Wb72bc52063ac_4409_8ae3_6c5c78c08c4d&file=c5a13e4f-9dc7-469e-9edb-dad7cca6d725>.

BACKGROUND OF THE INVENTION

The present disclosure relates generally to the field of computer databases, and more particularly to aggregating and summarizing sequences of hierarchical records.

In general, programs that generate database workload reports receive as an input a workload including a stream of structured query language operations (SQLs). The stream of SQLs includes SQLs associated with one or more transactions, which are sequences of SQLs. Transactions vary in length (i.e., the number of SQLs in the sequence). Some transactions include millions of SQLs. Consequently, a workload can include billions of SQLs. A workload may include hundreds or thousands of transactions, each of which may or may not be repeated in the stream of SQLs. In addition, the SQLs that are associated with each transaction can be distributed in the stream of SQLs (i.e., the SQLs of a transaction are generally non-consecutive).

SUMMARY

According to one embodiment of the present disclosure, a method for aggregating and summarizing sequences of hierarchical records is provided. The method includes receiving, by one or more computer processors, a capture log of a workload, wherein the workload includes a sequence of operations that are associated with a plurality of transactions, and wherein the plurality of transactions are instances of transaction types; creating, by one or more computer processors, a first data structure that models the transaction types as sequences of nodes, wherein the nodes identify operations in the workload; reading, by one or more computer processors, a task of an uncommitted transaction from the capture log, wherein a present operation and a transaction identifier are associated with the task; dissociating, by one or more computer processors, the transaction identifier from a first node of the first data structure, wherein the first node identifies a prior operation of the uncommitted transaction; associating, by one or more computer processors, the transaction identifier with a second node of the first data structure, wherein the second node identifies the present operation of the uncommitted transaction; dissociating, by one or more computer processors, in a second data structure, the first node from the transaction identifier; associating, by one or more computer processors, in the second data structure, the second node with the transaction identifier; and generating, by one or more computer processors, based, at least in part, on the first and the second data structures, a summary of the workload that includes signatures of the transaction types and a count of the instances of each of the transaction types.

According to another embodiment of the present disclosure, a computer program product for aggregating and summarizing sequences of hierarchical records is provided. The computer program product comprises a computer readable storage medium and program instructions stored on the computer readable storage medium. The program instructions include program instructions to receive a capture log of a workload, wherein the workload includes a sequence of operations that are associated with a plurality of transactions, and wherein the plurality of transactions are instances of transaction types; program instructions to create a first data structure that models the transaction types as sequences of nodes, wherein the nodes identify operations in the workload; program instructions to read a task of an uncommitted transaction from the capture log, wherein a present operation and a transaction identifier are associated with the task; program instructions to dissociate the transaction identifier from a first node of the first data structure, wherein the first node identifies a prior operation of the uncommitted transaction; program instructions to associate the transaction identifier with a second node of the first data structure, wherein the second node identifies the present operation of the uncommitted transaction; program instructions to dissociate, in a second data structure, the first node from the transaction identifier; program instructions to associate, in the second data structure, the second node with the transaction identifier; and program instructions to generate, based, at least in part, on the first and the second data structures, a summary of the workload that includes signatures of the transaction types and a count of the instances of each of the transaction types.

According to another embodiment of the present disclosure, a computer system for aggregating and summarizing sequences of hierarchical records is provided. The computer system includes one or more computer processors, one or more computer readable storage media, and program instructions stored on the computer readable storage media for execution by at least one of the one or more processors. The program instructions include program instructions to receive a capture log of a workload, wherein the workload includes a sequence of operations that are associated with a plurality of transactions, and wherein the plurality of transactions are instances of transaction types; program instructions to create a first data structure that models the transaction types as sequences of nodes, wherein the nodes identify operations in the workload; program instructions to read a task of an uncommitted transaction from the capture log, wherein a present operation and a transaction identifier are associated with the task; program instructions to dissociate the transaction identifier from a first node of the first data structure, wherein the first node identifies a prior operation of the uncommitted transaction; program instructions to associate the transaction identifier with a second node of the first data structure, wherein the second node identifies the present operation of the uncommitted transaction; program instructions to dissociate, in a second data structure, the first node from the transaction identifier; program instructions to associate, in the second data structure, the second node with the transaction identifier; and program instructions to generate, based, at least in part, on the first and the second data structures, a summary of the workload that includes signatures of the transaction types and a count of the instances of each of the transaction types.

BRIEF DESCRIPTION OF THE DRAWINGS

FIG. 4B is a table that depicts one example of a hash table for aggregating transactions in a workload, in accordance with an embodiment of the present disclosure.

FIG. 4C is a table that depicts one example of a summary of a workload, in accordance with an embodiment of the present disclosure.

DETAILED DESCRIPTION

Embodiments of the present invention recognize that the number of transaction types in a stream of SQLs may be less than the number of transactions in the workload. In many cases, a workload includes a few hundred or a few thousand transactions, each of which may or may not be repeated in the stream of SQLs. In addition, the SQLs that are associated with each transaction can be distributed in the stream of SQLs (i.e., transactions generally do not appear in the stream as consecutive strings of respective SQLs). In general, workload reports include the count and frequency with which each transaction type appears in the stream.

Embodiments of the present disclosure recognize a need to generate database workload reports in an acceptable amount of processing time, wherein the process of generating the report is completed in memory (i.e., without utilizing secondary store storage, such as a hard disk drive or solid-state drive). In some cases, programs that generate workload reports go out of memory due to storing large numbers of SQLs associated with incomplete transactions. As described herein, some transactions are described as a sequence of a million or more SQLs. In one example of an approach for generating summaries of workloads, programs store each SQL in memory until the final SQL of an associated transaction appears in the stream. When the final SQL appears in the stream, the count of the associated transaction is increased by one and the associated string of SQLs is deleted from memory for that instance of the transaction. One issue with this approach is that it utilizes a large number of memory addresses to store SQLs of uncommitted transactions. For example, the SQLs that represent a particular transaction are generally distributed and out-of-sync in the workload (i.e., a transaction generally does not appear as a sequence of consecutive SQLs in the workload). And in some cases, multiple instances of a transaction type are stored concurrently in memory. Consequently, programs that generate workload reports using this approach can quickly run out of memory in situations where transactions include a large number of SQLs (e.g., one million or more SQLs).

Embodiments of the present disclosure summarize large sequences of hierarchical records in a data structure within bounded memory, as described herein.

Figure 1:
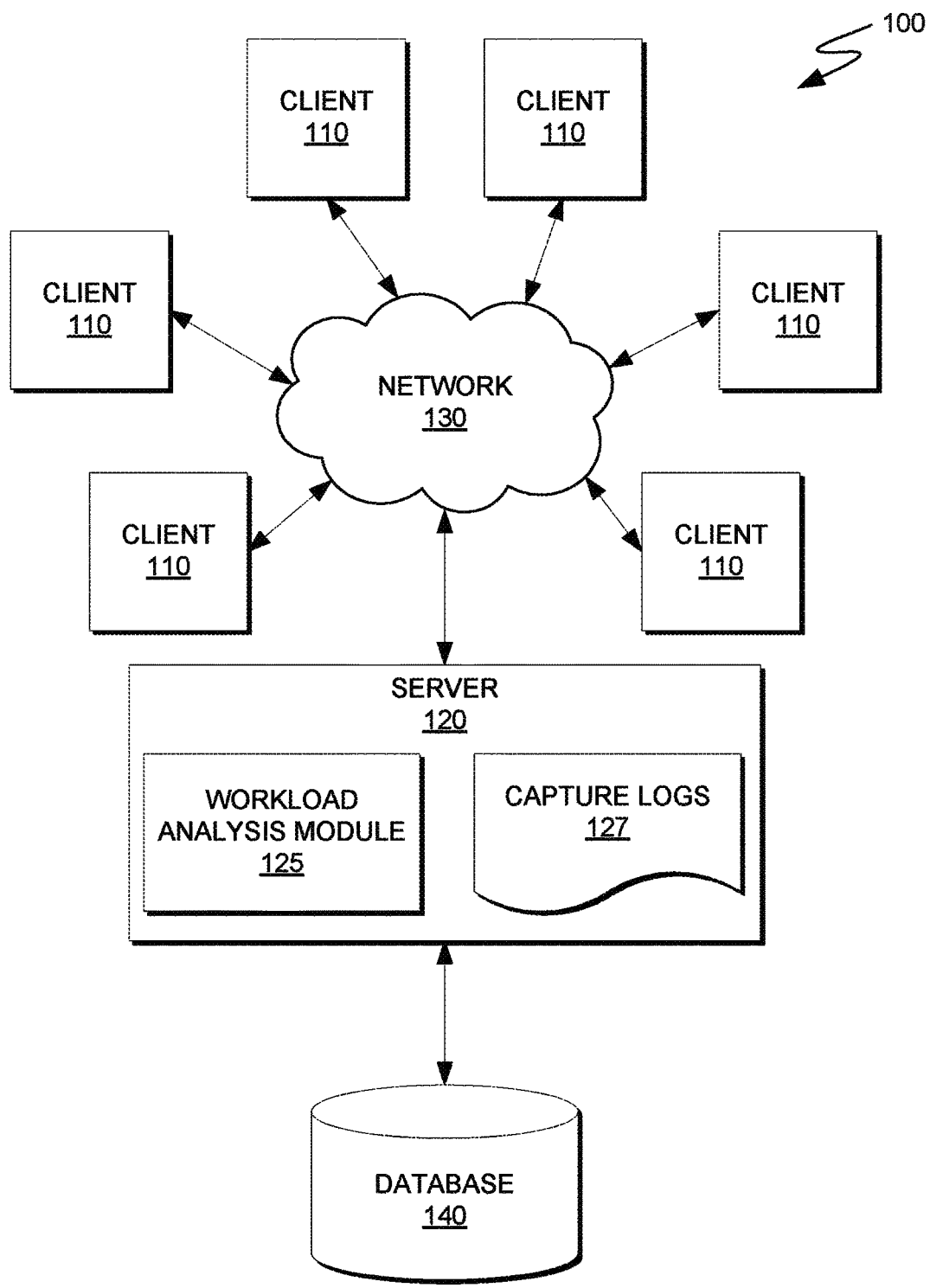
FIG. 1 is a functional block diagram illustrating a computing environment for aggregating and summarizing sequences of hierarchical records, in accordance with an embodiment of the present disclosure.

The present disclosure will now be described in detail with reference to the Figures. FIG. 1 is a functional block diagram illustrating a computing environment for aggregating and summarizing sequences of hierarchical records, in accordance with an embodiment of the present disclosure. Computing environment 100 includes clients 110, server 120, and database 140. Network 130 connects clients 110 and server 120. Server 120 and database 140 are communicatively connected. Server 120 includes workload analysis module 125 and capture logs 127.

In various embodiments, each of clients 110 is a computing device that can be a standalone device, a server, a laptop computer, a tablet computer, a netbook computer, a personal computer (PC), or a desktop computer. In some embodiments, clients 110 include a mixture of different types of computing devices. In other embodiments, one or more of clients 110 represents a computing system utilizing clustered computers and components to act as a single pool of seamless resources. In general, each of clients 110 can be any computing device or a combination of devices with access to server 120.

In various embodiments, network 130 is a local area network (LAN), a wide area network (WAN) such as the Internet, or a combination of the two, and can include wired connections, wireless connections, fiber optic connections or other types of communicative connections. In general, network 130 can be any combination of connections and protocols that supports communication between clients 110 and server 120, in accordance with an embodiment of the present disclosure.

In various embodiments, server 120 is a computing device that can be a standalone device, a server, a laptop computer, a tablet computer, a netbook computer, a personal computer (PC), or a desktop computer. In some embodiments, server 120 represents a computing system utilizing clustered computers and components to act as a single pool of seamless resources. In general, server 120 can be any computing device or a combination of devices that stores or has access to capture logs 127 and with access to and/or capable of executing workload analysis module 125. Server 120 can include internal and external hardware components, as depicted and described in further detail with respect to FIG. 6.

As described herein, workload analysis module 125 operates to aggregate and summarize sequences of hierarchical records that are recorded in capture logs 127. In the embodiment depicted in FIG. 1, workload analysis module 125 and capture logs 127 are stored on server 120. In other embodiments, workload analysis module 125 and/or capture logs 127 are stored on another computing device, provided that server 120 can access/execute workload analysis module 125 and capture logs 127. In yet other embodiments, workload analysis module 125 and/or capture logs 127 are stored externally and accessed through a communication network, such as network 130.

Database 140 is a data repository that may be written to and read by server 120. In some embodiments, database 140 represents a plurality of databases that act as a single pool of seamless resources. In the embodiment depicted in FIG. 1, server 120 manages database 140 in response to various actions of clients 110. In other embodiments, clients 110 access database 140 directly. In yet other embodiments, programs and entities outside of computing environment 100 can access database 140 in order populate database 140 and/or generate workloads in database 140. Server 120 executes workloads in database 140 in response to the actions of clients 110. Workloads include one or more sequences of hierarchical records that are composed of SQLs, as described herein. Server 120 records workloads in capture logs 127. Persons of ordinary skill in the art will understand that database workloads can be created in various ways. FIG. 1 depicts just one example of a computing environment that generates workloads in database 140. In other embodiments, different computing environments generate workloads in database 140.

Figure 2:
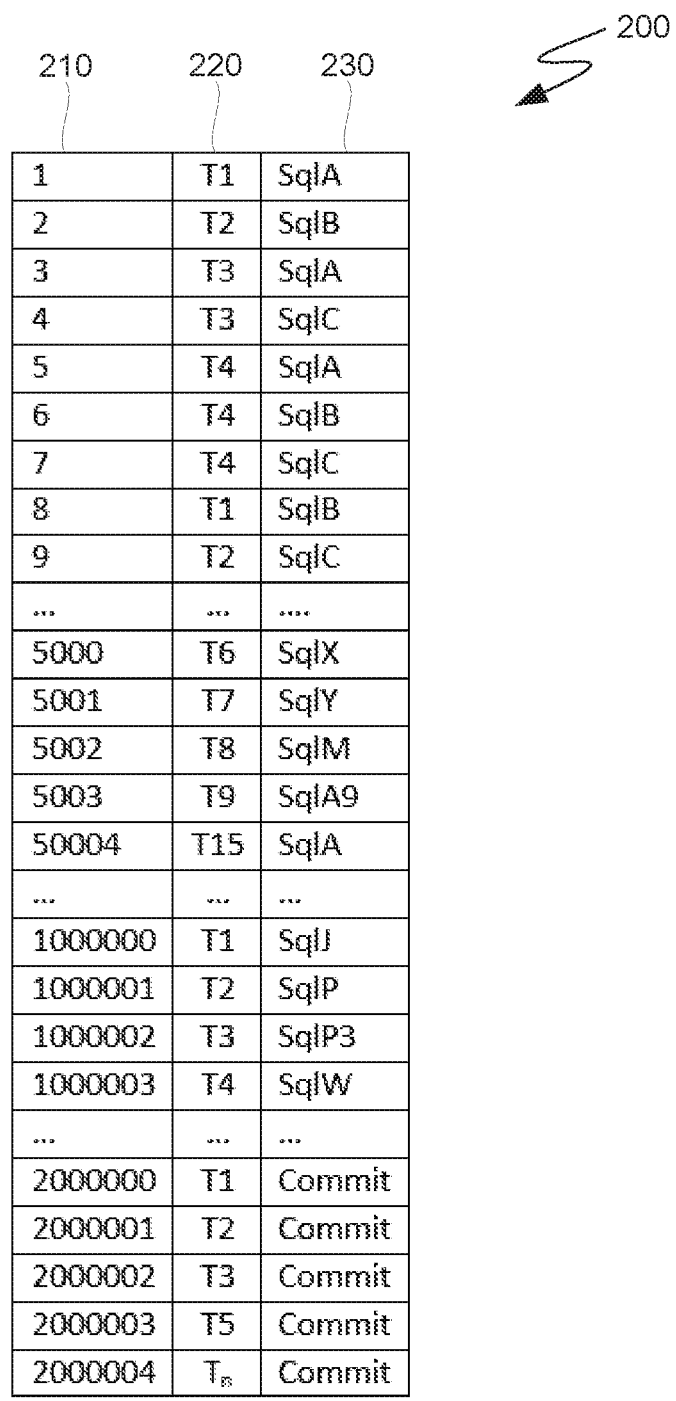
FIG. 2 is a table that depicts an example of a workload as recorded in a capture log, in accordance with an embodiment of the present disclosure.

FIG. 2 is a table that depicts an example of a workload as recorded in a capture log (e.g., capture logs 127), in accordance with an embodiment of the present disclosure. Table 200 includes columns 210, 220, and 230. Column 210 lists tasks in the sequence in which they were processed by server 120 (i.e., task 1 was the first task and task 2000004 is the last task in this example of a workload). As shown in table 200, a workload can include more than one million individual tasks. Column 220 lists transaction IDs. Each task in column 210 is associated with a transaction ID. Column 230 lists SQLs. Each SQL in column 230 is associated with a transaction ID. Accordingly, each task in column 210 is associated with a transaction ID from column 220 and a SQL or an end-unit-of-work (e.g., "commit" or "rollback") from column 230. A transaction ID is data that identifies a particular transaction. Each transaction ID in column 220 is associated with a sequence of one or more SQLs in column 230. The workload depicted in FIG. 2 is hierarchical in the sense that the workload is a sequence of transactions, and each transaction is a sequence of SQLs.

In general, most workloads include one or more instances of each "transaction type." As used herein, a "transaction type" is a particular species of transaction that is identified by a specific sequence of SQLs (i.e., a "signature"). Accordingly, each transaction in a workload is an instance of a transaction type. In some embodiments of the present disclosure, transaction types are associated with transaction IDs of instances of the transaction types. In one example of such embodiments, each transaction type is associated with the transaction ID of the first instance of the transaction type to complete. In other embodiments, transaction types are associated with identifiers that are different than the transaction IDs of the various instance(s) of the transaction types (e.g., transactions T1, T4, and T15 are instances of transaction type $T_a$). While the total number of transactions in a workload can be very high (e.g., a million or more transactions), the number of transaction types is, in general, significantly lower (e.g., a few hundred or a few thousand transaction types).

Based on capture logs like the capture log depicted in FIG. 2, workload analysis module 125 is able to identify the sequence of SQLs that are associated with each transaction type in one or more workloads (i.e., the signatures of each transaction type), aggregate the transaction types in one or more workloads, and summarize the one or more workloads (e.g., provide a count of instances of each transaction type), as discussed herein.

Embodiments of the present disclosure recognize that it is advantageous to perform analyses of workloads within memory (i.e., without storing information to secondary storage until the analyses are complete). One approach for aggregating and summarizing transactions within a workload sequence is to iterate through each task in the workload and maintain a list of all uncommitted transactions (i.e., instances of transaction not having an end-unit-of-work) in a data structure in memory. Upon registering an end-unit-of-work, all SQLs for the committed transaction are deleted from the data structure and a count of instances of respective transaction types is increased by one. In some examples of this approach, another data structure in memory is a list that aggregates the transaction types and maintains a count of instances of each transaction type. Once all tasks in the workload are processed, the second data structure is moved to secondary storage to serve as a summary of the workload sequence. One issue with this approach is that the data structure including uncommitted transaction can trigger an out of memory condition when one or more transactions are very large (e.g., over 500,000 SQLs) and/or end-units-of-work for a large percentage of transactions do not appear until late in the workload sequence. In an out of memory condition, at least some data within memory is migrated to secondary storage in order to continue analyzing the workload sequence. Consequently, an out-of-memory condition can increase the amount of time required to process a workload.

Embodiments of the present disclosure provide an ability to analyze, aggregate, and summarize workloads in memory. While the number of transactions and SQLs in a workload can be very high, the number of transaction types in a workload is generally relatively low. It is usually possible to aggregate the signatures of transaction types (i.e., the sequence of SQLs that describe each transaction type) in memory without triggering an out of memory condition. In various embodiments of the present disclosure, workload analysis module 125 identifies and aggregates the signatures of transaction types within one or more workloads using a plurality of hierarchical data structures (e.g., linked lists or tree data structures). Within a workload, however, SQLs from one instance of a transaction type are, in general, interspersed with SQLs from other transactions, including other instances of the same transaction type. Consequently, it can be difficult to determine the signature of each transaction type from the workload sequence as a whole. Through the use of hierarchical data structures, workload analysis module 125 is able to differentiate multiple instances of a transaction type, as described herein. The aggregated signatures enable workload analysis module 125 to manage a list of uncommitted transactions in a memory efficient manner, as described herein.

Figure 3A:
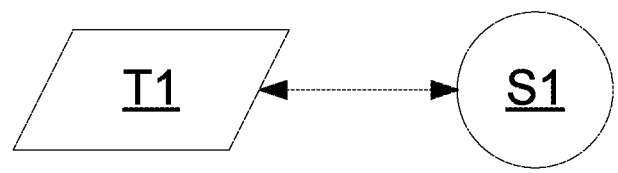
FIGS. 3A-3N are graphical representations of a forest of trees data structure that represent tasks within a workload, in accordance with an embodiment of the present disclosure.
Figure 3B:
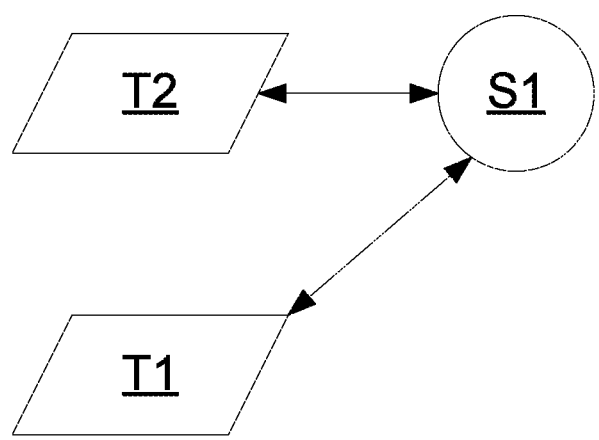
Figure 3C:
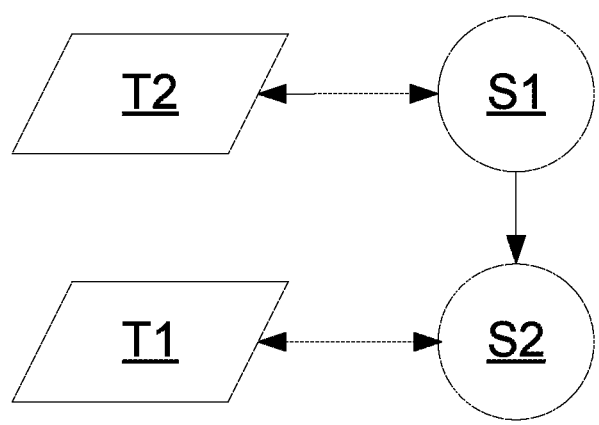
Figure 3D:
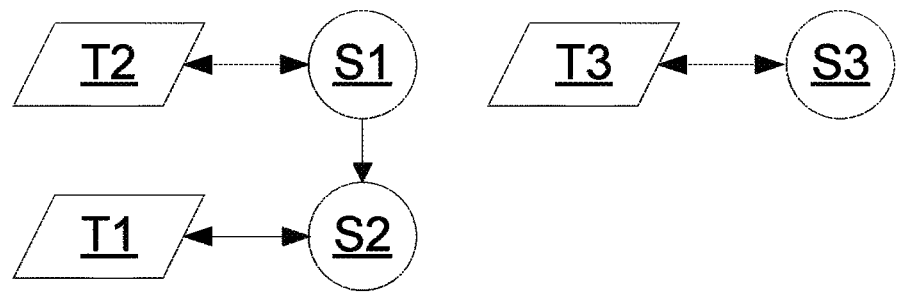
Figure 3E:
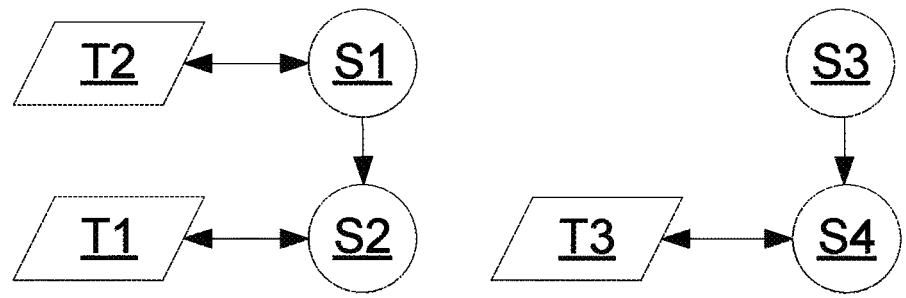
Figure 3F:
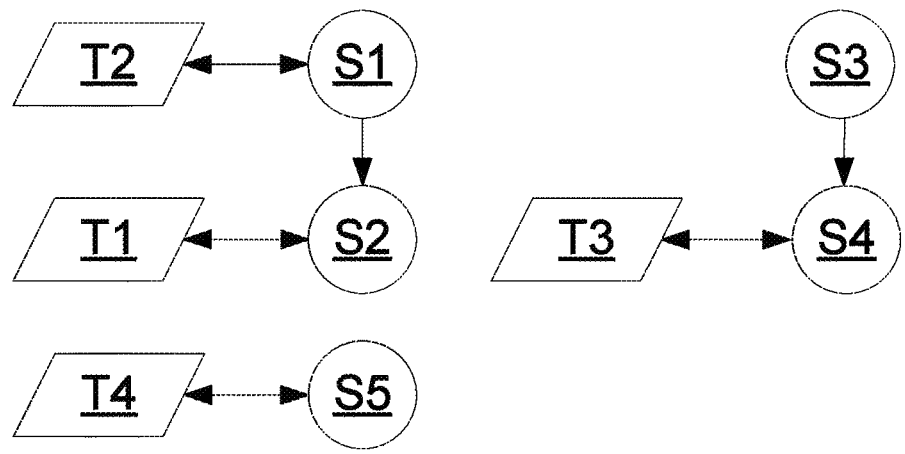
Figure 3G:
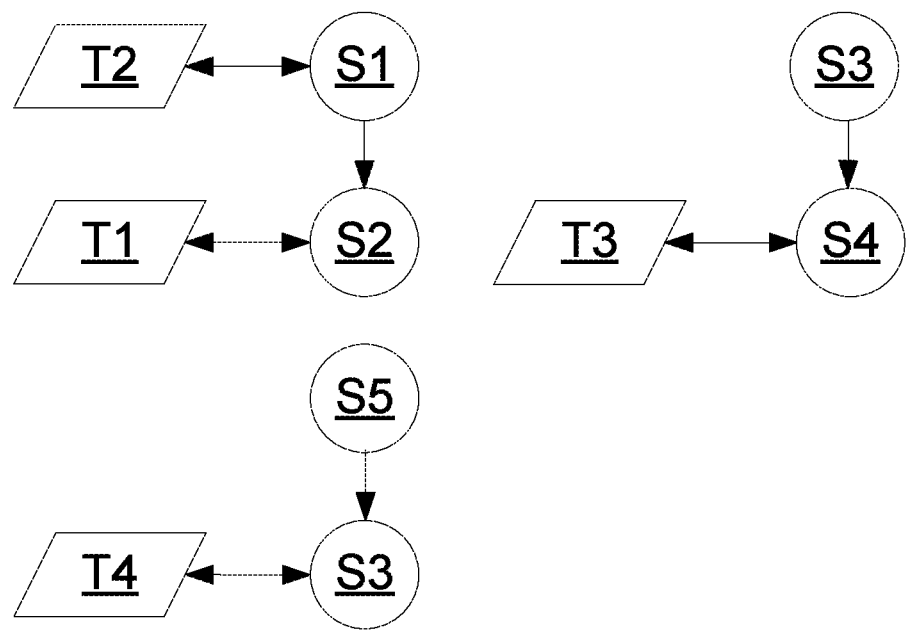
Figure 3H:
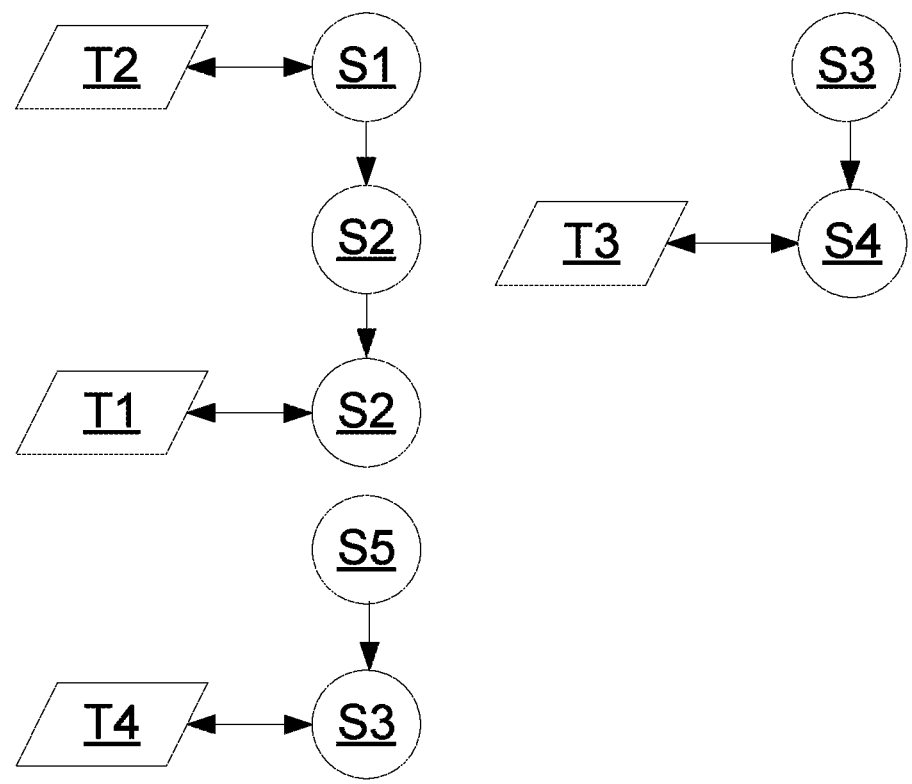
Figure 3I:
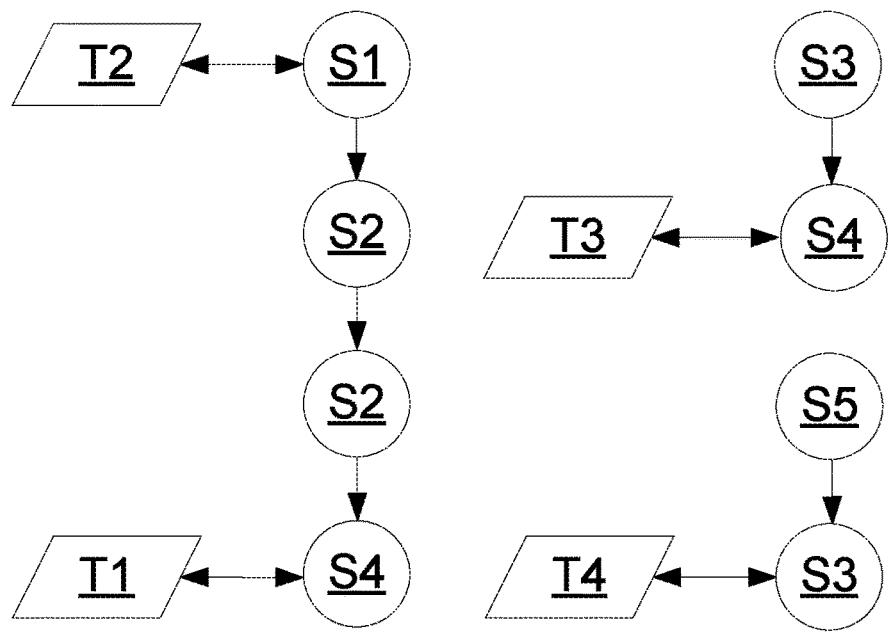
Figure 3J:
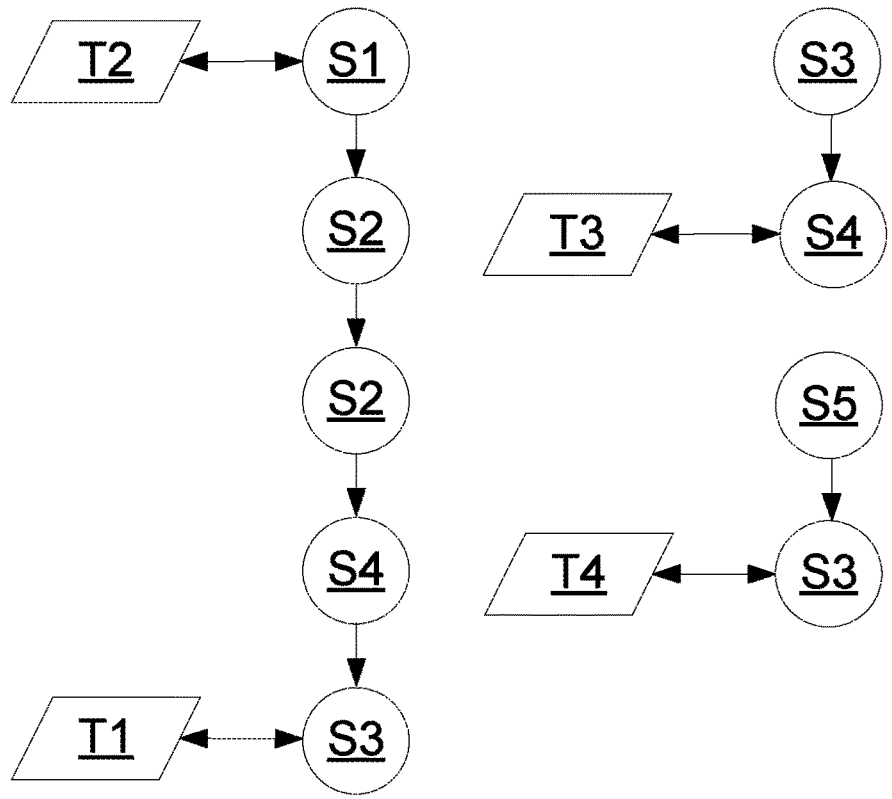
Figure 3K:
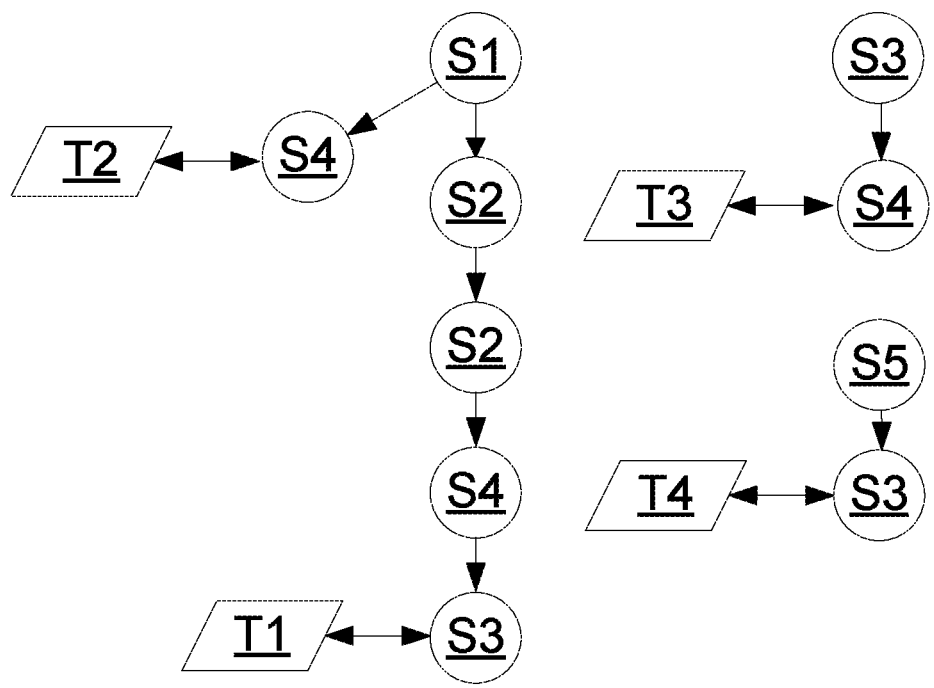
Figure 3L:
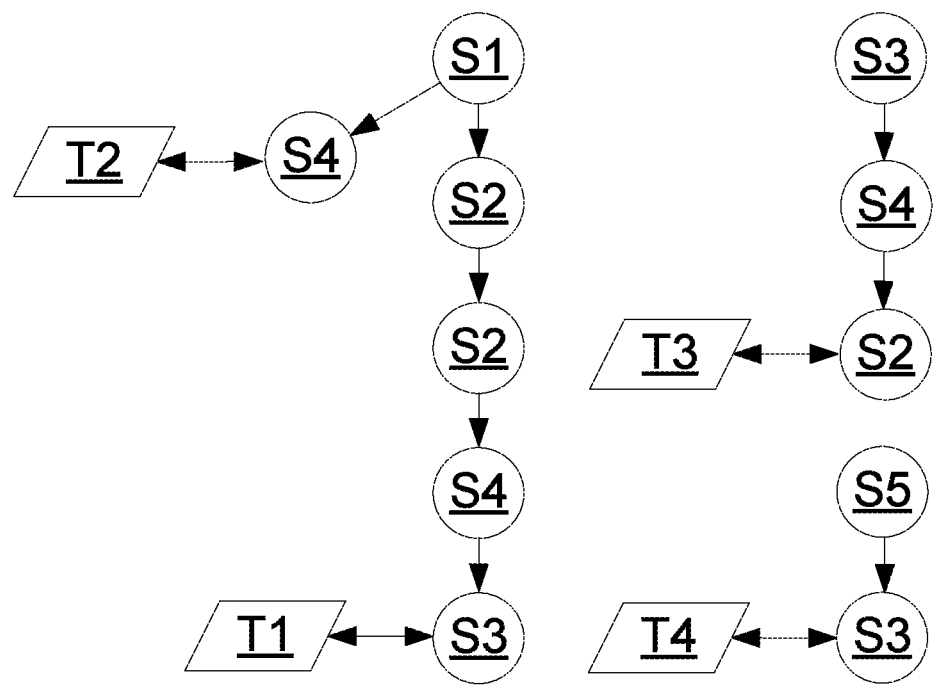
Figure 3M:
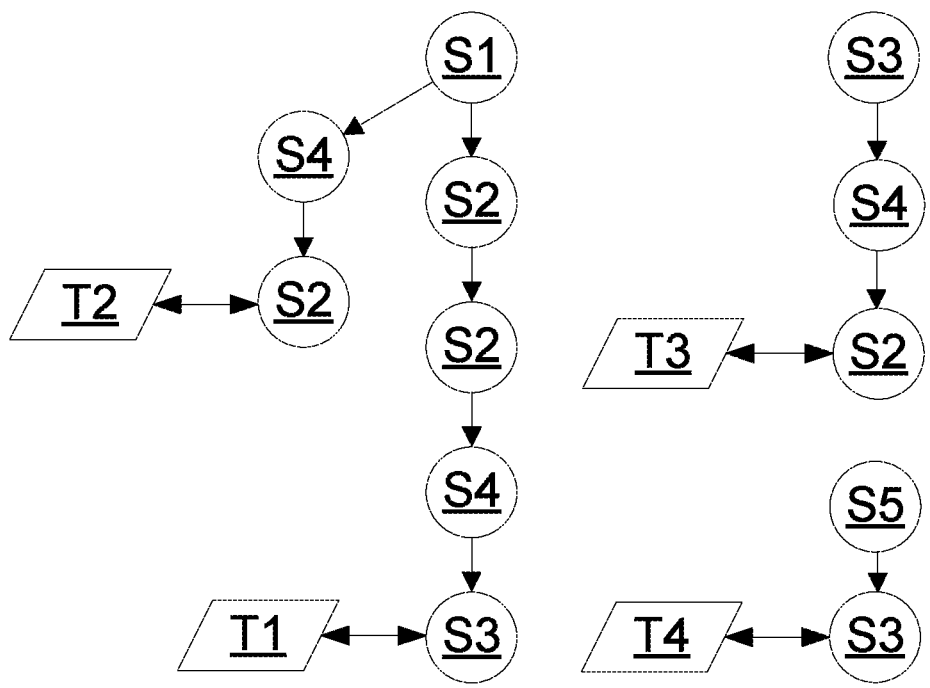
Figure 3N:
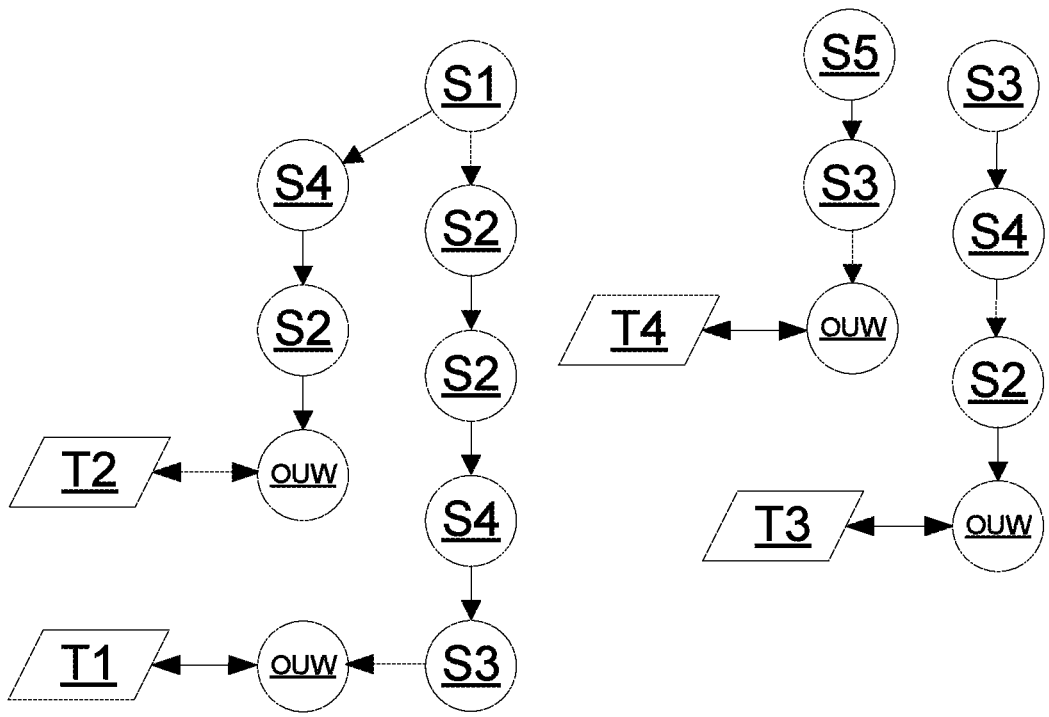

FIGS. 3A-3N are graphical representations of a process for determining the signatures of a plurality of transaction types in an example workload sequence, in accordance with an embodiment of the present disclosure. As discussed herein, the signature of a transaction type is a sequence of SQLs. FIGS. 3A-3N depict the construction of a plurality of tree data structures (i.e., a forest of trees) from an example workload having the following sequence of tasks:

(T1,S1)→(T2,S1)→(T1,S2)→(T3,S3)→(T3,S4)→(T4,S5)→(T4,S3)→(T1,S2)→(T1,S4)→(T1,S3)→(T2,S4)→(T3,S2)→(T2,S2)→(T2,UOW)→(T3,UOW)→(T4,UOW)→(T1,UOW);

wherein T1, T2, T3, and T4 are respective transaction IDs of a first, a second, a third, and a fourth transaction, and wherein S1, S2, S3, S4, and S5 are SQLs that are variously associated with transaction IDs T1, T2, T3, and T4. "UOW" is an end-unit-of-work.

FIG. 3A is graphical representation of a tree that represents the first task in the workload. FIG. 3A includes an association between transaction ID T1 and a node that represents an instance of SQL S1. This instance of SQL S1 is the root node of a tree that is associated with the signature of the first transaction.

FIG. 3B is a graphical representation of a tree that represents the first two tasks in the workload. FIG. 3B includes an association between transaction ID T2 and the root node of the tree that is associated with transaction ID T1 (i.e., SQL S1). SQL 1 is the root node of a tree in which a first branch represents the signature of the first transaction and a second branch represents the signature of a second transactions.

FIG. 3C is a graphical representation of a tree that represents the first three tasks in the workload. FIG. 3B includes a reference from a SQL S1 root node to a node that represents an instance of SQL S2. This instance of SQL S2 is a child node of the SQL S1 node and the leaf node of the branch that represents the signature of the first transaction. Transaction ID T1 is now associated with the SQL S2 leaf node of the respective branch.

FIG. 3D is a graphical representation of a forest of trees that represents the first four tasks in the workload. FIG. 3D includes an association between transaction ID T3 and a node that represents an instance of SQL S3. This instance of SQL S3 is the root node of a tree that represents the signature of the third transaction.

FIG. 3E is a graphical representation of a forest of trees that represents the first five tasks in the workload. FIG. 3E includes a reference from a SQL S3 root node to a node that represents an instance of SQL S4. This instance of SQL S4 is a child node of the SQL S3 root node and the leaf node of the tree that represents the signature of the third transaction. Transaction ID T3 is now associated with the SQL S3 leaf node of the tree.

FIG. 3F is a graphical representation of a forest of trees that represents the first six tasks in the workload. FIG. 3F includes an association between transaction ID T4 and a node that represents an instance of SQL S5. This instance of SQL S5 is the root node of a tree that represents the signature of the fourth transaction.

FIG. 3G is a graphical representation of a forest of trees that represents the first seven tasks in the workload. FIG. 3G includes a reference from a SQL S5 root node to a node that represents an instance of SQL S3. This instance of SQL S3 is a child node of the SQL S5 root node and a leaf node of the tree that represents the signature of the fourth transaction. Transaction ID T4 is now associated with the SQL S3 leaf node of the respective tree.

FIG. 3H is a graphical representation of a forest of trees that represents the first eight tasks in the workload. FIG. 3H includes a reference from a first SQL S2 node that represents a first instance of SQL S2 to a second SQL S2 node that represents a second instance of SQL S2. The second SQL S2 node is a child node of the first SQL S2 node and the leaf node of the branch that represents the signature of the first transaction. The first and second SQL S2 nodes are distinguishable based, at least in part, on the nodes that they reference and/or their respective relationships to the root node. Transaction ID T1 is now associated with the second SQL S2 node, which is a leaf node of the respective branch of the tree.

FIG. 3I is a graphical representation of a forest of trees that represents the first nine tasks in the workload. FIG. 3I includes a reference from the second SQL S2 node to a node that represents an instance of SQL S4. This instance of SQL S4 is a child node of the second SQL S2 node and a leaf node of the branch that represents the signature of the first transaction. Transaction ID T1 is now associated with the SQL S4 leaf node of the respective branch of the tree.

FIG. 3J is a graphical representation of a forest of trees that represents the first ten tasks in the workload. FIG. 3J includes a reference from a SQL S4 parent node to a node that represents an instance of SQL S3. This instance of SQL S3 is a child node of the SQL S4 parent node and a leaf node of the branch that represents the signature of the first transaction. Transaction ID T1 is now associated with the SQL S3 leaf node of the respective branch of the tree.

FIG. 3K is a graphical representation of a forest of trees that represents the first eleven tasks in the workload. FIG. 3K includes a reference from the SQL S1 root node to a node that represents an instance of SQL S4. This instance of SQL S4 is a child node of the SQL S1 root node and a leaf node of the branch that represents the signature of the second transaction. Transaction ID T2 is now associated with the SQL S4 leaf node of the respective branch of the tree.

FIG. 3L is a graphical representation of a forest of trees that represents the first twelve tasks in the workload. FIG. 3L includes a reference from a SQL S4 parent node to a node that represents an instance of SQL S2. This instance of SQL S2 is a child node of the SQL S4 parent node and a leaf node of the tree that represents the signature of the third transaction. Transaction ID T3 is now associated with the SQL S2 leaf node of the respective tree.

FIG. 3M is a graphical representation of a forest of trees that represents the first thirteen tasks in the workload. FIG. 3M includes a reference from a SQL S4 parent node to a node that represents an instance of SQL S2. This instance of SQL S2 is a child node of the SQL S4 parent node and a leaf node of the portion of the tree that represents the signature of the second transaction. Transaction ID T2 is now associated with the SQL S2 leaf node of the respective portion of the tree.

FIG. 3N is a graphical representation of a forest of trees that represents all tasks in the workload. FIG. 3M includes references to end-unit-of-work nodes that are leaf nodes of the various trees. Each of transactions IDs T1, T2, T3, and T4 point to an end-unit-of-work leaf node.

Workload analysis module 125 uses the process depicted in FIGS. 3A-3N to model transactions within workloads as a forest of trees and traverses each tree to determine the signatures of each transaction type. Workload analysis module 125 can traverse the trees via a pre-order walk, a post-order walk, an in-order walk, a level-order walk, or another type of walk known in the art. FIGS. 3A-3N depicts a simplified workload where each transaction is a transaction type for illustrative simplicity. In operation, workload analysis module 125 can receive as an input a workload that includes transactions that are arbitrary permutations of each other, workloads that have an arbitrary number of transaction sequences, workloads that contain transaction types that are arbitrarily long sequences of SQLs, or a workload having a combination of the aforementioned properties.

The memory foot print for storing the forest of trees data structures, as described herein, can be expressed mathematically:

$$O(m*n*k+2*(1-k)*n); \qquad \text{Expression 1}$$

wherein O indicates the use of "big O" notation to describe the memory footprint of a workload in which the number of SQLs is m, the number of transaction instances (i.e., a count of instances of each transaction type) is n, and the fraction of transaction types is k. The value of k is:

$$1/n \leq k \leq 1; \qquad \text{Expression 2}$$

wherein k is equal to 1/n if all the transactions are similar and k is equal to one if all transactions are of a single type. In general, real-world workloads tend to include at least some transactions of the same type. Persons of ordinary skill in the art will understand that k is generally much closer to 1/n than one and the memory footprint of various embodiments of the present disclosure is generally closer to O(m+n) than O(m*n) in real-world scenarios. Accordingly, the memory foot print of embodiments of the present disclosure generally increases linearly and not multiplicatively with increasing workload complexity in real-world scenarios. Embodiments of the present disclosure have been found to decrease memory usage by at least two orders of magnitude (i.e., over one hundred times) compared to approaches where a list of all SQLs of uncommitted transactions is stored in memory.

Figure 4A:
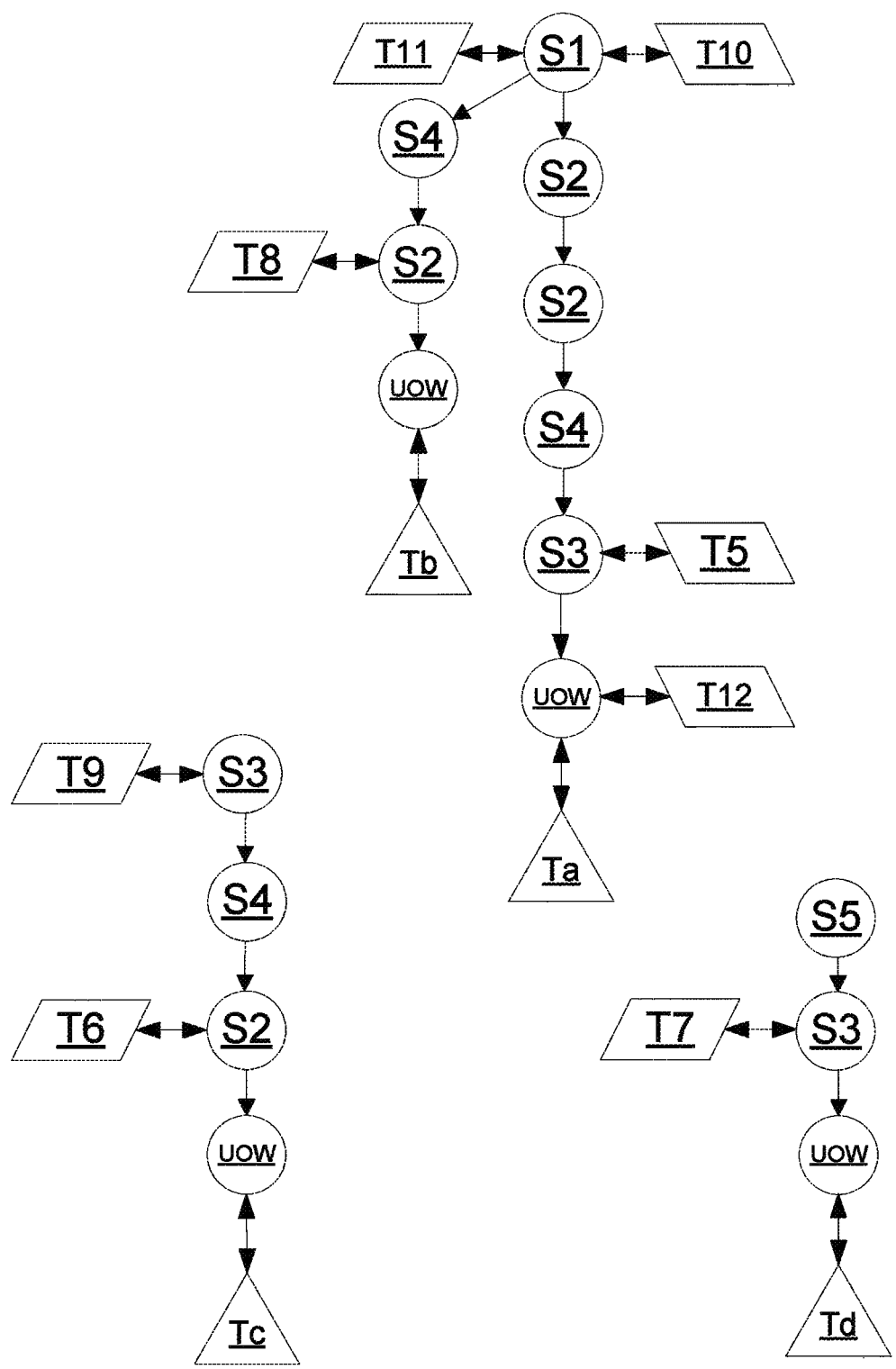
FIG. 4A is a graphical representation of a forest of trees in which trees have been constructed for four transaction types and various instances of the transaction types are associated with the trees, in accordance with an embodiment of the disclosure.

FIGS. 4A-4C depict one example of how workload analysis module 125 models, aggregates, and summarizes transactions in a workload using a forest of trees data structure, a hash table, and a summary table. The workload depicted in FIGS. 4A-4C includes the sequence of tasks depicted in FIGS. 3A-3N and a sequence of subsequent tasks that produces the forest of trees depicted in FIG. 4A, the hash table depicted in FIG. 4B, and the summary table depicted in FIG. 4C.

FIG. 4A is a graphical representation of a forest of trees data structure in which trees have been constructed for four transaction types and various instances of the transaction types are associated with the trees, in accordance with an embodiment of the disclosure. Specifically, workload analysis module 125 constructs trees for the transactions associated with transaction IDs T1, T2, T3, and T4, as depicted in FIGS. 3A-3N. In the embodiment depicted in FIG. 4A, workload analysis module 125 respectively classifies the transactions associated with transaction IDs T1, T2, T3, and T4 as instances of transaction types Ta, Tb, Tc, and Td. Workload analysis module 125 determines the signatures of transactions Ta, Tb, Tc, and Td by traversing the respective trees, as described herein.

As depicted in FIG. 4A, transaction IDs T5, T6, T7, T8, T9, T10, T11, and T12 are each an instance of one of transaction types Ta, Tb, Tc, and Td and are associated with various nodes in the respective trees. Specifically, workload analysis module 125 associates the aforementioned transaction IDs with the node of the last SQL that appeared in the workload for the respective transaction ID. In some embodiments, each node in the forest of trees is associated with a list that is a null list or a list of the transaction ID(s) with which a respective node is associated. Based, at least in part, on the node with which a transaction ID is associated, it is possible to reconstruct the transaction that is associated with the transaction ID by traversing the respective branch and/or tree. For example, FIG. 4A shows that the transaction that is associated with transaction ID T12 includes, in order, tasks (T12, S1,); (T12, S2); (T12, S2); (T12, S4); (T12, S3); and (T12, UOW). In the embodiment depicted in FIG. 4A, task (T12, UOW) is associated with the leaf node that is associated with transaction type Ta. Workload analysis module 125 therefore classifies the transaction associated with transaction ID T12 as an instance of transaction type Ta.

In the embodiment depicted in FIGS. 4A-4C, workload analysis module 125 also manages a hash table that lists (i) each transaction ID that workload analysis module 125 identifies in the workload and (ii) associates each transaction ID with the node that the transaction ID is associated with in the forest of trees data structure. The hash table allows workload analysis module 125 to determine the position of each transaction ID in the forest of trees data structure (e.g., FIG. 4A), as described herein.

FIG. 4B is a table that depicts associations in one example of a hash table, in accordance with an embodiment of the present disclosure. Table 400 is managed by workload analysis module 125 and includes columns 410, 420, and 430. Column 410 lists keys that are associated with transaction IDs that workload analysis module 125 identifies in the workload. Column 420 lists the transaction IDs, wherein each transaction ID is associated with a key. As shown in FIG. 4B, table 400 includes multiple instances of the transaction types depicted in FIG. 4A (i.e., transactions Ta, Tb, Tc, and Td). Column 430 lists the last SQL identified for each transaction ID in the workload. As discussed with respect to FIG. 5, workload analysis module 125 updates entries in column 430 when it identifies the next SQL that is associated with one of the transaction IDs in table 400. Workload analysis module 125 creates new entries in table 400 for new transaction IDs that appear in the workload.

Compared to recording all SQLs that are associated with uncommitted transactions, recording only the most recently identified SQL for each transaction ID in table 400 allows workload analysis module 125 to aggregate (i.e., count instances of transaction types) in a more memory efficient manner. Table 400 includes entries for transaction IDs T1, T2, T3, and T4 to show the associations between nodes and transaction IDs of committed (i.e., completed) transactions are removed from the forest of trees data structure. In embodiments like the one depicted in FIG. 4B, entries for committed transactions are retained in table 400. In other embodiments, entries for committed transactions are counted and then deleted from table 400 to, at least in part, create space in memory.

FIG. 4C is a table that depicts one example of a summary of a workload, in accordance with an embodiment of the present disclosure. Workload analysis module 125 generates summary table 450 based, at least in part, on the workload and information depicted in FIGS. 4A and 4B. Summary table 450 includes columns 460, 470, and 480. Column 460 lists the transaction types that were identified in one or more workloads. Column 470 lists the signatures of each transaction type, as determined using the process depicted in FIG. 3A-3N and discussed herein with respect to FIG. 5. Column 480 includes a count of instances for each transaction type. In some embodiments, workload analysis module 125 increments a count when a transaction is associated with an end-unit-of-work (i.e., a UOW) and workload analysis module 125 is able to classify the transaction as an instance of one of the transaction types, as described herein.

Figure 5:
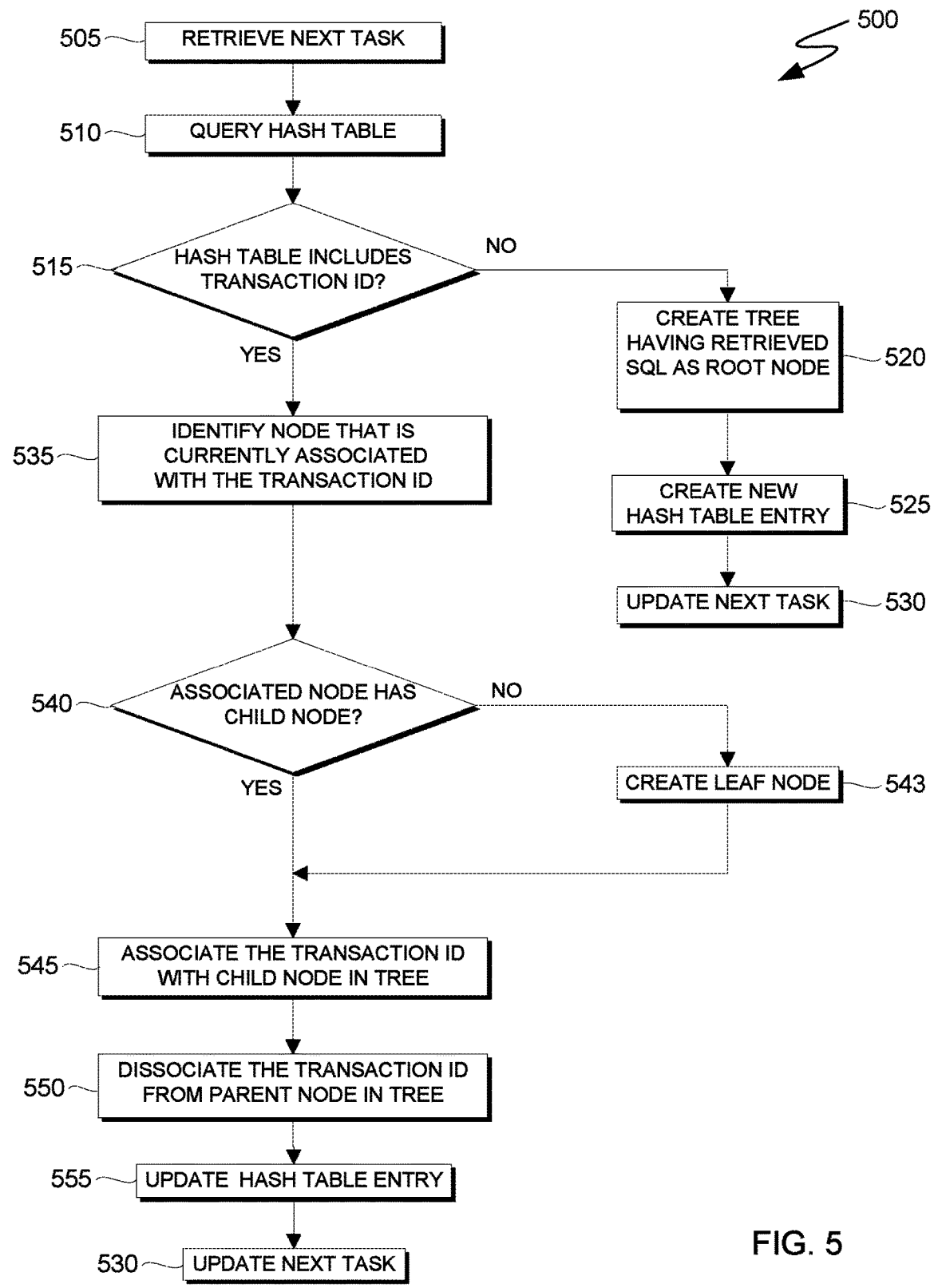
FIG. 5 is a flowchart that depicts logic for managing a hierarchical data structure and managing a hash table, in accordance with an embodiment of the present disclosure.

FIG. 5 is a flowchart that depicts logic for managing a hierarchical data structure and managing a hash table, on a computing device within the computing environment of FIG. 1, in accordance with an embodiment of the present disclosure. For example, FIG. 5 is a flowchart depicting logic 500 that workload analysis module 125 executes within the computing environment of FIG. 1.

In operation 505, workload analysis module 125 retrieves the next task in a workload from a capture log (e.g., capture logs 127). The next task can be the first task in a workload. In various embodiments, a task includes a transaction ID and an SQL.

In operation 510, workload analysis module 125 queries a hash table (e.g., table 400) for an entry that is associated with the transaction ID of the retrieved task (i.e., the retrieved transaction ID).

In decision 515, workload analysis module 125 determines if the hash table includes an entry that is associated with the retrieved transaction ID based, at least in part, on the result of the query. If workload analysis module 125 determines that an entry is associated with the retrieved transaction ID (decision 515, YES branch), workload analysis module 125 performs operation 535. This determination indicates that a tree that models the transaction that is associated with the retrieved transaction ID exists in memory (or, in some embodiments, secondary storage). If workload analysis module 125 determines that no entries are associated with the retrieved transaction ID (decision 515, NO branch), no tree exists in memory for the transaction ID and, in response, workload analysis module 125 performs operation 520.

In operation 520, workload analysis module 125 creates, in a hierarchical data structure in memory, a tree that has a root node that represents the SQL of the retrieved task (i.e., the retrieved SQL), as described with respect to FIGS. 3A-3N. Workload analysis module 125 also associates the retrieved transaction ID with the root node of the tree in operation 520. In some embodiments, workload associates the transaction ID and the root node by adding the retrieved transaction ID to a list of associated transaction IDs. More than one transaction ID can be associated with the root node or any other node in some embodiments.

In operation 525, workload analysis module 125 creates a new hash table entry (that is associated with the retrieved transaction ID and the root node that represents the retrieved SQL (i.e., the first SQL in the signature of the transaction). After creating the new hash table entry, workload analysis module 125 performs operation 530 (i.e., workload analysis module updates the next task to reflect the next task in the workload sequence).

In operation 535, workload analysis module 125 identifies the node that is currently associated with the retrieved transaction ID. In some embodiments, workload analysis module 125 identifies the node based, at least in part, on the results of the query. If, for example, the retrieved transaction ID is T10, querying table 400 for transaction ID T10 would enable workload analysis module 125 to identify SQL node S2 as the node that is currently associated with the retrieved transaction ID. In the example depicted in FIG. 4A, the retrieved SQL will indicate whether the transaction that is associated with transaction ID T10 is associated with transaction type Ta, transaction type Tb, or a fifth transaction type (e.g., a transaction type identified as transaction type Te).

In decision 540, workload analysis module 125 determines if the currently associated node has a child node. In other words, workload analysis module 125 determines if a different transaction (i.e., a transaction that is associated with a different transaction ID) describes, at least in part, the transaction that is associated with the retrieved transaction ID. While the two transactions would be identical up to the previous SQL of the transaction associated with the retrieved transaction ID, the two transactions could be associated with different transaction types if subsequent SQLs differ. If workload analysis module 125 determines that the currently associated node has a child node (decision 540, YES branch), workload analysis module 125 performs operation 545. This determination indicates that at least one other transaction is identical to the transaction that is associated with the retrieved transaction ID up to at least the retrieved SQL. If workload analysis module 125 determines that the currently associated node does not have a child node (decision 540, NO branch), workload analysis module performs operation 543. This determination indicates that the transaction that is associated with retrieved transaction ID is the first instance of a transaction type.

In operation 543, workload analysis module 125 creates a leaf node, as described with respect to FIGS. 3A-3N, wherein the leaf node is child node of the node that is currently associated with the retrieved transaction ID. Because the newly created node is a leaf node, it is a node in a new branch of a tree that describes a newly identified transaction type, wherein the complete signature of the newly identified transaction is not yet known if the retrieved SQL is not an end-unit-of-work.

In operation 545, workload analysis module 125 associates the retrieved transaction ID with the child node of the node identified in operation 535 (i.e., the parent node of the newly associated node). In some embodiments, workload analysis module 125 makes the association by adding the retrieved transaction ID to a list of associated transaction IDs.

In operation 550, workload analysis module 125 dissociates the retrieved transaction ID and the node identified in operation 535. In some embodiment, workload analysis module 125 makes the dissociation by removing the retrieved transaction ID from a list of associated transaction IDs.

In operation 555, workload analysis module 125 updates the hash table entry that is associated with the retrieved transaction ID. The updated hash table entry associates the retrieved transaction ID with the node to which the retrieved transaction ID is associated with following operation 545. After updating the hash table entry, Workload analysis module 125 performs operation 530 (i.e., workload analysis module updates the next task to reflect the next task in the workload sequence).

Figure 6:
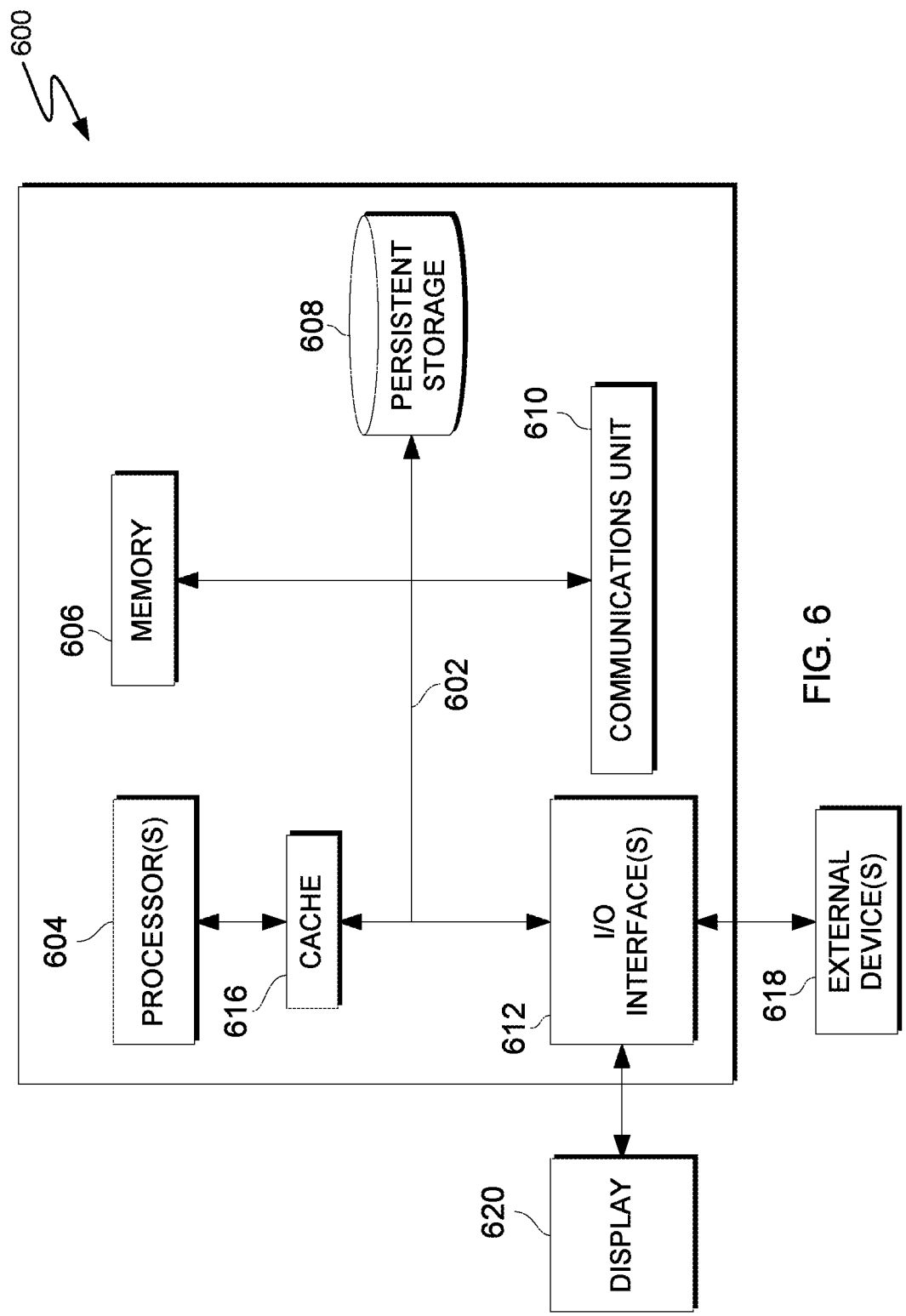
FIG. 6 is a functional block diagram that depicts a computer system for aggregating and summarizing sequence of hierarchical records, in accordance with an embodiment of the present disclosure.

FIG. 6 is a functional block diagram that depicts a computer system for aggregating and summarizing sequence of hierarchical records, in accordance with an embodiment of the present disclosure. Computer system 600, is an example of a computer system for executing workload analysis module 125. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data and data near accessed data from memory 606.

Program instructions and data used to practice embodiments of the present invention may be stored in persistent storage 608 for execution by one or more of the respective processors 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

receiving, by one or more computer processors, a capture log of a workload, wherein the workload includes a sequence of operations that are associated with a plurality of transactions, and wherein the plurality of transactions are instances of transaction types;

identifying, by one or more computer processors, a first data structure that models, at least in part, the transaction types as sequences of nodes, wherein each node identifies a respective operation in the sequence of operations in the workload, and wherein the first data structure is stored in one or more primary memories such that an out-of-memory condition is not triggered;

reading, by one or more computer processors, a task of an uncommitted transaction from the capture log, wherein a present operation and a transaction identifier are associated with the task;

dissociating, by one or more computer processors, the transaction identifier from a first node of the first data structure, wherein the first node identifies a prior operation of the uncommitted transaction;

associating, by one or more computer processors, the transaction identifier with a second node of the first data structure, wherein the second node identifies the present operation of the uncommitted transaction;

dissociating, by one or more computer processors, in a second data structure, the first node from the transaction identifier, wherein the first node was associated with the transaction identifier in the second data structure based, at least in part, on the prior association between the first node and the transaction identifier in the first data structure, and wherein the second data structure is stored in the one or more primary memories such that the out-of-memory condition is not triggered;

associating, by one or more computer processors, in the second data structure, the second node with the transaction identifier, wherein the present operation represents a most-recently-identified operation and, from among the sequences of nodes, each transaction identifier in the second data structure is associated with only a node representing a respective most-recently-identified operation based, at least in part, on associations between each transaction identifier and respective nodes in the sequences of nodes of the first data structure; and generating, by one or more computer processors, based, at least in part, on the first and the second data structures, a summary of the workload that includes signatures of the transaction types and a count of the instances of each of the transaction types.

2. The method of claim 1, wherein the first data structure is a hierarchical data structure that includes one or more trees and wherein creating the first data structure comprises:

associating, by one or more computer processors, a first plurality of operations of the transaction types with root nodes of one or more trees that represent the signatures of the transaction types; and associating, by one or more computer processors, a second plurality of operations of the transaction types with descendant nodes of the root nodes.

3. The method of claim 2, wherein the signatures of the transaction types are determined by traversing the trees.

4. The method of claim 3, wherein the trees are traversed by a walk selected from the group consisting of a pre-order walk, a post-order walk, an in-order walk, and a level-order walk.

5. The method of claim 1, wherein the second data structure is a hash table.

6. The method of claim 1, wherein the first data structure and the second data structure are stored completely in memory.

7. The method of claim 1, wherein a memory footprint of the first data structure increases linearly, and wherein the memory footprint is based, at least in part, on (i) a count of operations in the workload, (ii) a count of instances of transaction types, and (iii) a fraction of transaction types.

\* \* \* \* \*